United States Patent [19]

Drout et al.

[11] Patent Number: 5,084,501
[45] Date of Patent: Jan. 28, 1992

[54] HIGHLY FILLED RESIN POWDER

[75] Inventors: Frank G. Drout, Lancaster; Donald L. Kurtz, Lititz; Elvin M. Weidman, Willow Street, all of Pa.

[73] Assignee: Armstrong World Industries, Inc., Lancaster, Pa.

[21] Appl. No.: 267,840

[22] Filed: Nov. 7, 1988

[51] Int. Cl.$^5$ .......................... C08K 3/26; C08J 9/30; C08L 27/00
[52] U.S. Cl. .................................... 524/425; 524/437; 524/492; 524/493
[58] Field of Search ............... 521/73; 524/569, 425, 524/437, 492, 493

[56] References Cited

U.S. PATENT DOCUMENTS

| | | | |
|---|---|---|---|
| 2,663,695 | 12/1953 | Perloff et al. | 260/23 |
| 3,101,241 | 8/1963 | McKee | 524/569 |
| 3,152,096 | 10/1964 | Darby | 524/569 |
| 3,211,689 | 10/1965 | Darby | 524/569 |
| 3,272,772 | 9/1966 | Russell | 260/41 |
| 3,288,747 | 11/1966 | Sussman | 260/37 |
| 3,849,365 | 11/1974 | Bauer | 524/569 |
| 3,917,550 | 11/1975 | Clas | 524/569 |
| 4,040,997 | 8/1977 | Van Vonno et al. | 260/23 |
| 4,425,449 | 1/1984 | Dorsey | 521/73 |

*Primary Examiner*—Paul R. Michl
*Assistant Examiner*—T. McDonald, Jr.

[57] ABSTRACT

A highly filled PVC resin powder is formed by coating filler particles with a liquid and blending a dispersion grade PVC resin with the coated filler particles in a low shear mixer. Resin compositions having 60% to 95% filler can be formed. A majority of the resin particles have a size of less than 15 microns. The filler has a particle size distribution in which at least 50% by weight and preferably at least 95% by weight of the particles are retained on a 200 mesh (U.S. Standard) screen. The liquid is a plasticizer and/or stabilizer. Such a composition may be sintered to form a porous mass or layer and the mass or layer printed with a plastisol or acrylate ink.

19 Claims, 1 Drawing Sheet

HIGHLY FILLED RESIN POWDER

BACKGROUND OF THE INVENTION

This invention relates to highly filled PVC resin compositions, and more particularly, powdered, vinyl resin compositions having at least 60% filler by weight. Since the filler material is relatively inexpensive as compared to vinyl resin, such compositions reduce the cost of fused vinyl layers formed from the composition. Further, such a composition may be sintered to form a very porous layer which permits deeper penetration of ink.

PRIOR ART

Previous, powdered PVC resin compositions have been limited to 50% by weight of filler, as a practical matter. This was due to the fact that the prior art resin compositions used general-purpose resins and the specific gravity of the filler material was relatively high. The more highly filled the resin, the greater the tendency of the filler to settle to the bottom of the composition, yielding a non-uniform composition. The present invention yields resin compositions having 60 to 90% by weight of filler in which the filler and resin are substantially uniformly distributed.

Van Vonno et al. U.S. Pat. No. 4,040,997 discloses a method for incorporating processing additives in polyvinyl chloride resins and an additive concentrate for use therein. Van Vonno et al. prepare an aqueous emulsion of lubricants and stabilizers and then mix the emulsion with finely divided particulate fillers and/or pigments. The emulsion is 5 to 50 parts per one hundred parts of particulate. In most cases, the additive concentrate will comprise from 3% to 30% by weight of lubricant, 2% to 15% stabilizer, 25% to 80% particulate substrate, and 5% to 3% water. Two percent to 10% by weight of the additive concentrate is blended with the PVC polymer in a high shear mixer.

A typical "highly filled" resin of the prior art is disclosed in Perloff et al. U.S. Pat. No. 2,663,659. One Hundred parts of a rosin or tall oil coated, precipitated calcium carbonate having an average particle size of one to 15 microns is combined with 180 parts of a plastisol. The plastisol is prepared by grinding 300 parts of vinyl chloride resin with 240 parts of dioctyl phthalate to form a fine powder. The invention of Perloff et al. is to coat the filler particles with chlorinated paraffin wax to improve the viscosity characteristics of the resin/filler composition. The coated particles are added to a suspension of resin particles and a liquid vehicle. The inorganic filler constitutes 30% to 40% of the final composition.

Note that in both Van Vanno et al. and Perloff et al. the filler is a finely particulate solid. In Van Vanno et al., the particle size is 1 to 6 microns and in Perloff et al., the particle size ranges from 1 to 25 microns.

The filler in Russell U.S. Pat. No. 3,272,772 is also "in finely divided condition". The fillers have a very high degree of division in order to provide a large quantity of surface area to adsorb vinyl monomer. The finely divided filler is treated with a polar vinyl monomer itself or by contacting the filler with a solution of the monomer in an inert liquid. The polar vinyl monomer treated filler is mixed with chlorinated high density polyethylene to produce a uniform dispersion of the treated filler throughout the body of the plastic. Although Russell discloses a filler to resin ratio of up to 4 to 1, the resin is not a dispersion grade polyvinyl chloride. The filler and chlorinated polyethylene are mixed under conditions which result in the polyethylene being polymerized.

Sussman U.S. Pat. No. 3,288,747 discloses a filler coated with a curing agent, an epoxy resin, an accelerator, or a curing agent/accelerator mix. The amount of filler may vary from 10 to 300% of the total weight of epoxy resin and curing agent. Once again, the use of a finely divided filler, having particle size of approximately 325 mesh, is taught. A portion of the filler is mixed with the epoxy resin in a two roller or a sigma blade mixer, or by melting the resin and mixing in a heavy duty mixer. Solvent may be used to dissolve the resin, the filler incorporated, and the solvent subsequently flashed off. This results in the filler having a thin coating or film which cakes or agglomerates and requires pulverizing to permit screening through a 60 mesh or finer screen.

In summary, none of the prior art discloses a powdered resin composition having filler particles and a dispersion grade polyvinyl chloride (PVC) resin. Further, none of the prior art teaches filler particles of substantial size in comparison to the resin particles of the compositions.

SUMMARY OF THE INVENTION

There has been a long standing need in the resilient flooring industry for a highly filled PVC resin composition. By "highly filled") is meant a composition having at least 60% by weight of filler. Since filler is relatively inexpensive, such a composition reduces the cost of manufacturing resilient flooring. Also, a highly filled composition improves wear resistance and when sintered, enables deep penetration of plastisol inks.

Therefore, it is an object of the present invention to provide a powdered, highly filled PVC resin. A key to the invention is the use of relatively large filler particles and a dispersion grade PVC resin. A preferred particle distribution is such that at least 50% by weight, preferably, 70% by weight and most preferably, 95% by weight of the filler particles are retained on a 200 mesh (U.S. Standard) screen. More preferably, at least 95% of the filler particles are retained on a 100 mesh (U.S. Standard) screen, and most preferably, 95% of the filler particles are retained on a 50 mesh (U.S. Standard) screen.

Dispersion grade PVC resin has a particle size distribution in which a majority, and preferably at least 95% by weight, of particles are less than 15 microns in size. The prior PVC resin compositions have used a general purpose resin which has a much larger particle size.

It has been found that a uniform distribution of PVC resin and filler can be obtained even at high filler content if the filler particles are coated with a liquid such as a liquid plasticizer and/or stabilizer and blended with a dispersion grade PVC resin. As shown in FIG. 1, the smaller resin particles adhere to the surface of the filler particles and the composition retains its flowable powder characteristics.

In prior PVC resin compositions, the plasticizer and/or stabilizer is absorbed by the resin and then the filler is added. Since the filler particles have a relatively high specific gravity, they tend to concentrate at the bottom of the resin composition unless the composition is continually mixed.

Another object of the invention is to form a highly porous mass by sintering the resin composition of the invention. It has been found that the composition can be sintered under a relatively low temperature for a brief period so that the relatively large filler particles are tacked together by the resin coating yielding a highly porous mass.

A further object of the invention is to provide a method for forming a highly filled PVC resin. As previously indicated, this is accomplished by coating the filler particles with a liquid, preferably the plasticizer and/or stabilizer, and then blending a dispersion grade PVC resin. It has been found that a low shear mixer such as Baker-Perkins mixer is preferred. A high shear mixer, such as a Henschel mixer, tends to knock the resin particles off the surface of the filler particles.

DETAILED DESCRIPTION

Figure 1:
FIG. 1 is a SEM picture showing 5 to 15 micron PVC resin particles coated on a 75 to 150 micron filler particle.

A highly filled powdered PVC resin composition can be made by adhering dispersion grade PVC resin to the surface of relatively large filler particles. By adhering the resin particles to the surface of the filler particles, a uniform distribution is maintained. If the resin particles are relatively large compared to the filler particles, the resin particles will not adhere to or coat the filler particles and the filler particles would tend to concentrate at the bottom of the resin composition.

The procedure of the prior art was to blend the liquid components of the resin composition, such as plasticizers and stabilizers, with the PVC resin. The liquid components would be absorbed into the resin components. Then the filler would be blended into the mixture. Since the liquid components were absorbed into the filler particles, the composition would retain its dry flowable powder characteristics. However, the heavier filler particles would tend to settle at the bottom of the composition.

It has been found that by modifying the mixing procedure, a highly filled composition could be obtained which retained its uniform distribution. The filler particles were coated with the liquid components and then a dispersion grade PVC resin was blended with the coated filler particles. By this means, the relatively small, less than 15 micron resin particles would coat or adhere to the surface of the relatively large filler particles.

Since the resin composition is intended for use in the manufacture of resilient flooring, the preferred filler particles are limestone, aluminum trihydrate, and quartz. These fillers improve the wear characteristics of the resilient flooring. Further, since the filler material is relatively inexpensive, the highly filled composition lowers the cost of manufacture.

Another advantage of using a highly filled PVC resin is that the resin can be sintered to form a highly porous mass which will enable deep penetration of a plastisol or acrylate ink.

To maintain the relative size differential between the filler particles and resin particles to enable the resin particles to adhere to the surface of the filler particles, the resin particles should be of a dispersion grade. In a dispersion grade PVC resin, the majority of resin particles are less than 15 microns. The size distribution of the filler particles should be such that at least 50% of the particles are retained on a 200 mesh (U.S. Standard) screen, preferably at least 95% of the filler particles are retained on a 200 mesh (U.S. Standard) screen and most preferably, 95% of the fillers particles are retained on a 50 mesh (U.S. Standard) screen. Therefore, the resin particles are about 5 to 15 microns and the filler particles are at least 75 microns, preferably, 150 microns, and most preferably, 300 microns in size.

Although the earlier compositions were made using a high shear Henschel mixer, more highly filled compositions could be obtained by using a low shear Baker-Perkins mixer. It is believed that the high shear tends to knock the resin particles off the surface of the filler particles.

It was also determined that the filler level could be increased by coating the filler particles with liquid before blending the dispersion grade resin rather than blending the filler and dispersion resin before adding the liquid. Obviously, by blending the filler and liquids before adding the dispersion resin more effectively coats the filler particles with liquid and subsequently with the resin particles. If the liquid is added to the blended filler and dispersion resin, the liquid tends to be absorbed into the dispersion resin.

EXAMPLE 1

A powdered resin composition was made from the following components:

| | |
|---|---|
| Dispersion grade resin (Tenneco 0565 - a copolymer of PVC and polyvinyl acetate manufactured by Occidental Petroleum) | 400 grams |
| Plasticizer (Di(2-ethylhexyl)phthalate) | 120 grams |
| Epoxy plasticizer (Drapex 4.4, an epoxidized tallate manufactured by Argus Chemical) | 10 grams |
| Stabilizer (Mark 275, a dibutyl tin maleate manufactured by Argus Chemical) | 10 grams |
| Filler (H-30-C, an aluminum trihydrate manufactured by Kaiser Aluminum & Chemical) | 2,000 grams |

Tenneco 0565 dispersion resin has a relative viscosity of 2.4, a percent volatiles of 0.5 and methanol extractables of 0.9. Drapex 4.4 is an octyl tallate epoxy plasticizer having a viscosity at 25° C. of 20 cps and a molecular weight of about 420. H-30 is hydrated alumina having a specific gravity of 2.42 and a percent cumulative screen analysis of from 2 to 6% on a 100 mesh Tyler Standard Screen, 60 to 85% on a 200 mesh Tyler Standard Screen and 85 to 95% on a 325 mesh Tyler Standard Screen.

The filler and dispersion resin was blended for one minute in a Henschel mixer at 1,800 rpm and with the cooling water cut in. The preblended plasticizer and stabilizer liquids were added slowly over two minutes. Then the sides of the mixer were cut down and the composition mixed for an additional three minutes.

This composition was sintered at 25 feet per minute. The screed was set with a 90 mil nip. The first oven zone was at 500° F. with bottom air and the second oven zone had a temperature of 375° F. with 50/50 top and bottom air. A sintered composition was printed with a plastisol ink using 40 mesh Zimmer screens with one-inch diameter solid rods and a number 6 magnet setting. The printed composition was fused in a three stage oven having temperatures of 400° F. in the first zone, 475° F. in the second zone and 300° F. in the third zone.

EXAMPLES 2 AND 3

Examples 2 and 3 are similar to Example 1 except that 40 mesh limestone was substituted for the H-30-C filler and the plasticizer was reduced to 100 grams in Example 2 and 80 grams in Example 3.

EXAMPLE 4

A quartz-filled PVC resin having the following composition was blended in a manner similar to the previous examples:

| | |
|---|---|
| Tenneco 0565 | 400 grams |
| DOP | 100 grams |
| Drapex 4.4 | 10 grams |
| Mark 275 | 10 grams |
| Flintshot 3.0 (A clear color quartz sold by 3-M) | 2,000 grams |

The particle size distribution of the Flink-shot 3.0 was 12.4% 30 (U.S. Standard) mesh, 56.8% 40 (U.S. Standard) mesh, 26.7% 50 (U.S. Standard) mesh, 3.5% 70 (U.S. Standard) mesh and 0.6% 100 (U.S. Standard) mesh.

The above composition was sifted through a 20 mesh (U.S. Standard) screen and laid up on a felt backing with a 60 mil nip roller. The lay-up was sintered at 375° F. for one minute, 45 seconds.

EXAMPLES 5 AND 6

The sintered base of Example 4 was printed with a plastisol ink (Example 5) and an acrylic (Example 6) using a rotary screen Zimmer printer. The weight of the components were as follows:

| Component | Example 5 | Example 6 |
|---|---|---|
| Felt backing | 21 grams | 21 grams |
| Sintered quart base of Example 4 | 24 grams | 24 grams |
| Plastisol ink | 18 grams | — |
| Acrylated polyester ink | — | 16.5 grams |

EXAMPLES 7, 8, AND 9

Examples 7 to 9 were blended from the following components by adding the filler to a Baker-Perkins mixer, turning the mixer on, adding the liquid stabilizer and plasticizer and blending for 30 seconds until uniformly blended, and adding the PVC resin and blending for one minute. No heating or cooling was necessary.

| Component | Example 7 (80% Filler) | Example 8 (85% Filler) | Example 9 (90% Filler) |
|---|---|---|---|
| Tenneco 0565 Resin | 204.0 g | 143.6 g | 90.6 g |
| DOP Plasticizer | 40.8 g | 28.8 g | 18.2 g |
| Mark 275 Stabilizer | 5.2 g | 3.6 g | 2.3 g |
| Filler | 1,000.0 g | 1,000.0 g | 1,000.0 g |

The filler was DF 5025 which is a ground dolomitic limestone sold by Pfizer Minerals, Pigments & Metals Division. The particle size distribution of the DF 5025 was such that a trace is larger than 40 mesh (U.S. Standard), 5% is larger than 50 mesh (U.S. Standard), and 75% is larger than 200 mesh (U.S. Standard).

What is claimed is:

1. A powdered resin composition comprising filler particles and a dispersion grade PVC resin, said dispersion grade PVC resin having particles with a particle size distribution in which a majority of the particles by weight are less than 15 microns in size, the resin composition being 60% to 95% by weight of the filler, the filler particles having a particle size distribution wherein at least 95% by weight of the filler particles are retained on a 100 mesh (U.S. Standard) screen, and the resin composition being a powder.

2. The resin composition of claim 1 wherein the resin particle size distribution is such that at least 95% by weight of the particles are less than 15 microns in size.

3. The resin composition of claim 1 wherein the composition is 70% to 85% by weight of the filler.

4. A resin composition comprising filler particles in a dispersion grade PVC resin, said dispersion grade PVC resin having particles with a particle size distribution in which a majority of the particles by weight are less than 15 microns in size, wherein the composition is more than 80% by weight of the filler and the resin composition is a powder.

5. The resin composition of claim 1 wherein the filler is selected from the group consisting of limestone, aluminum trihydrate and quartz.

6. A resin composition comprising filler particles and a dispersion grade PVC resin, said dispersion grade PVC resin having particles with a particle size distribution in which a majority of the particles by weight are less than 15 microns in size, wherein the dispersion grade resin particles are adhered to the surface of the filler particles and the resin composition is a powder.

7. The resin composition of claim 6 wherein at least 50% by weight of the filler particles are retained on a 200 mesh (U.S. Standard) screen.

8. The resin composition of claim 7 wherein at least 70% by weight of the filler particles are retained on a 200 mesh (U.S. Standard) screen.

9. The resin composition of claim 8 wherein at least 95% by weight of the filler particles are retained on a 200 mesh (U.S. Standard) screen.

10. The resin composition of claim 9 wherein at least 95% by weight of the filler particle are retained on a 100 mesh (U.S. Standard) screen.

11. The resin composition of claim 10 wherein at least 95% by weight of the filler particles are retained on a 50 mesh (U.S. Standard) screen.

12. The resin composition of claim 6, wherein the composition is 60% to 95% by weight of the filler.

13. The resin composition of claim 6 further comprising a liquid plasticizer and/or stabilizer and wherein the dispersion grade resin is adhered to the filler particles by said liquid plasticizer and/or stabilizer.

14. The resin composition of claim 13 which has been sintered to form a porous mass.

15. The sintered resin composition of claim 14 further comprising a plastisol or acrylate ink disposed within at least a portion of the porous mass.

16. A method of forming a highly filled resin composition comprising coating filler particles with a liquid and then blending a dispersion grade PVC resin, the formed highly filled resin composition being a powder.

17. The method of claim 16 wherein the liquid is selected from the group consisting of plasticizers and stabilizers.

18. The method of claim 16 wherein the filler particles are coated and the dispersion grade resin is blended in a low shear mixer.

19. The method of claim 16 wherein the filler comprises at least 60% of the resin composition by weight.

* * * * *